(12) United States Patent
Yen et al.

(10) Patent No.: US 11,612,257 B2
(45) Date of Patent: Mar. 28, 2023

(54) VALVE BODY, ELECTROMAGNET SWITCH VALVE AND BED STRUCTURE

(71) Applicant: Brilliant Product Design Co., Ltd., Taipei (TW)

(72) Inventors: Ying-Chun Yen, Taipei (TW); Yuan-Chen Chen, Taipei (TW)

(73) Assignee: Brilliant Product Design Co., Ltd., Taipei (TW)

( * ) Notice: Subject to any disclaimer, the term of this patent is extended or adjusted under 35 U.S.C. 154(b) by 107 days.

(21) Appl. No.: 17/089,738

(22) Filed: Nov. 5, 2020

(65) Prior Publication Data
US 2021/0298487 A1   Sep. 30, 2021

(30) Foreign Application Priority Data

Mar. 30, 2020   (TW) .................................. 109110831

(51) Int. Cl.
  *A47C 27/08*    (2006.01)
  *F16K 27/02*    (2006.01)

(52) U.S. Cl.
  CPC .......... *A47C 27/083* (2013.01); *F16K 27/029* (2013.01)

(58) Field of Classification Search
  CPC .............................. A47C 27/083; F16K 27/029
  See application file for complete search history.

(56) References Cited

U.S. PATENT DOCUMENTS

| | | | | |
|---|---|---|---|---|
| 2,435,425 A | * | 2/1948 | Cunningham | F16K 31/082 335/229 |
| 2,650,617 A | * | 9/1953 | Wasser | H01F 7/1607 335/251 |
| 2,695,154 A | * | 11/1954 | Dillman | F16K 31/0655 62/324.1 |
| 6,517,154 B2 | * | 2/2003 | Sawamoto | B60N 2/2809 296/68.1 |
| 7,095,304 B2 | | 8/2006 | Sano et al. | |
| 7,975,982 B2 | * | 7/2011 | Chan | F16K 31/0655 335/297 |

(Continued)

FOREIGN PATENT DOCUMENTS

CN   101963250   2/2011
CN   104676078   6/2015

(Continued)

OTHER PUBLICATIONS

"Office Action of Taiwan Counterpart Application", dated Apr. 12, 2021, p. 1-p. 4.

(Continued)

*Primary Examiner* — Eric Keasel
(74) *Attorney, Agent, or Firm* — JCIPRNET

(57) ABSTRACT

A valve body including an outer wall, an inner wall, and a connecting wall is provided. The outer wall has a first upper surface, a first side surface, and a second side surface. At least one of the first side surface and the second side surface has a fluid hole. The inner wall is disposed within the outer wall. The inner wall shields the at least one fluid hole. A third side surface has an inner opening. The connecting wall is disposed within the outer wall. The connecting wall connects the inner opening of the inner wall and the fluid hole of the outer wall. Furthermore, an electromagnet switch valve and a bed structure are also provided.

11 Claims, 16 Drawing Sheets

(56) References Cited

U.S. PATENT DOCUMENTS 8,936,041 B2 * 1/2015 Yun .................. F16K 31/082
251/38
2018/0231185 A1 8/2018 John et al.

FOREIGN PATENT DOCUMENTS

| CN | 108343773 | 7/2018 |
| CN | 207796231 | 8/2018 |
| CN | 108626434 | 10/2018 |
| CN | 108953683 | 12/2018 |
| CN | 208967189 | 6/2019 |
| CN | 214466434 | 10/2021 |
| TW | M514532 | 12/2015 |

OTHER PUBLICATIONS

"Office Action of China Counterpart Application", dated Jan. 19, 2023, p. 1-p. 14.

* cited by examiner

VALVE BODY, ELECTROMAGNET SWITCH VALVE AND BED STRUCTURE

CROSS-REFERENCE TO RELATED APPLICATION

This application claims the priority benefit of Taiwan application no. 109110831, filed on Mar. 30, 2020. The entirety of the above-mentioned patent application is hereby incorporated by reference herein and made a part of this specification.

BACKGROUND

Technical Field

The disclosure relates to a valve body, an electromagnet switch valve, and a bed structure.

Description of Related Art

An electromagnet switch valve is a device used to control the amount, direction, or flow state (i.e., flowing or not flowing) of a fluid flow. The electromagnet switch valve in the related art generally includes a fluid driving device and a corresponding valve body. The electromagnet switch valve opens or closes an internal flow channel through its internal control rod, so that the fluid driving device drives and transports the fluid to an external object to be filled with the fluid (e.g., an uninflated air bladder). However, due to the design, the current valve body cannot satisfy the requirement for providing an ultra-large flow at a low flow pressure. Therefore, the above is one of the issues for those skilled in the art to improve.

SUMMARY

The disclosure provides a valve body, which can reduce a flow pressure of a fluid flowing through the valve body and exhibits excellent reliability.

The disclosure provides an electromagnet switch valve, which can quickly inflate/deflate an object to be inflated/deflated and can save power and avoid the risk of fire.

The disclosure provides a bed structure, in which an inflatable bladder or a base can be quickly inflated.

The disclosure provides a valve body including an outer wall, an inner wall, and a connecting wall. The outer wall has a first upper surface, a first side surface, and a second side surface. The first upper surface is connected to the first side surface and the second side surface. The first upper surface has a first opening, and at least one of the first side surface and the second side surface has a fluid hole. The inner wall is disposed within the outer wall. The inner wall shields the at least one fluid hole. The inner wall has a second upper surface and a third side surface connected to the second upper surface. The second upper surface has a second opening. Opening directions of the first opening and the second opening are the same, and the third side surface has an inner opening. The connecting wall is disposed within the outer wall. The connecting wall connects the inner opening of the inner wall and the fluid hole of the outer wall.

The disclosure provides an electromagnet switch valve including an electromagnet driving member, a control rod, and at least one valve body as described above. The control rod includes a first rod body and a switch member connected to each other. The control rod is mechanically coupled to the electromagnet driving member through the first rod body. A size of the switch member is larger than a size of the second opening. In a first state, the electromagnet driving member drives the first rod body to drive the switch member to move to a first position. In a second state, the electromagnet driving member is powered off to maintain a position of the switch member. In a third state, the electromagnet driving member drives the first rod body to drive the switch member to move to a second position, where the first position is different from the second position.

The disclosure provides a bed structure including the above electromagnet switch valve and at least one inflatable bladder. The at least one inflatable bladder is connected to the at least one fluid hole of the at least one valve body, and the fluid driving device drives the fluid so that the fluid passes through the at least one valve body to inflate the at least one inflatable bladder.

Based on the above, in the valve body, the electromagnet switch valve, and the bed structure of the embodiments of the disclosure, through the design of the inner wall shielding the fluid hole, the flow pressure of the fluid in the valve body can be effectively reduced, and the valve body exhibits excellent reliability due to the low flow pressure. Moreover, it is possible to achieve the delivery of fluid in a large amount to quickly inflate the inflatable bladder.

To make the aforementioned more comprehensible, several embodiments accompanied with drawings are described in detail as follows.

DESCRIPTION OF THE EMBODIMENTS

Figure 1:
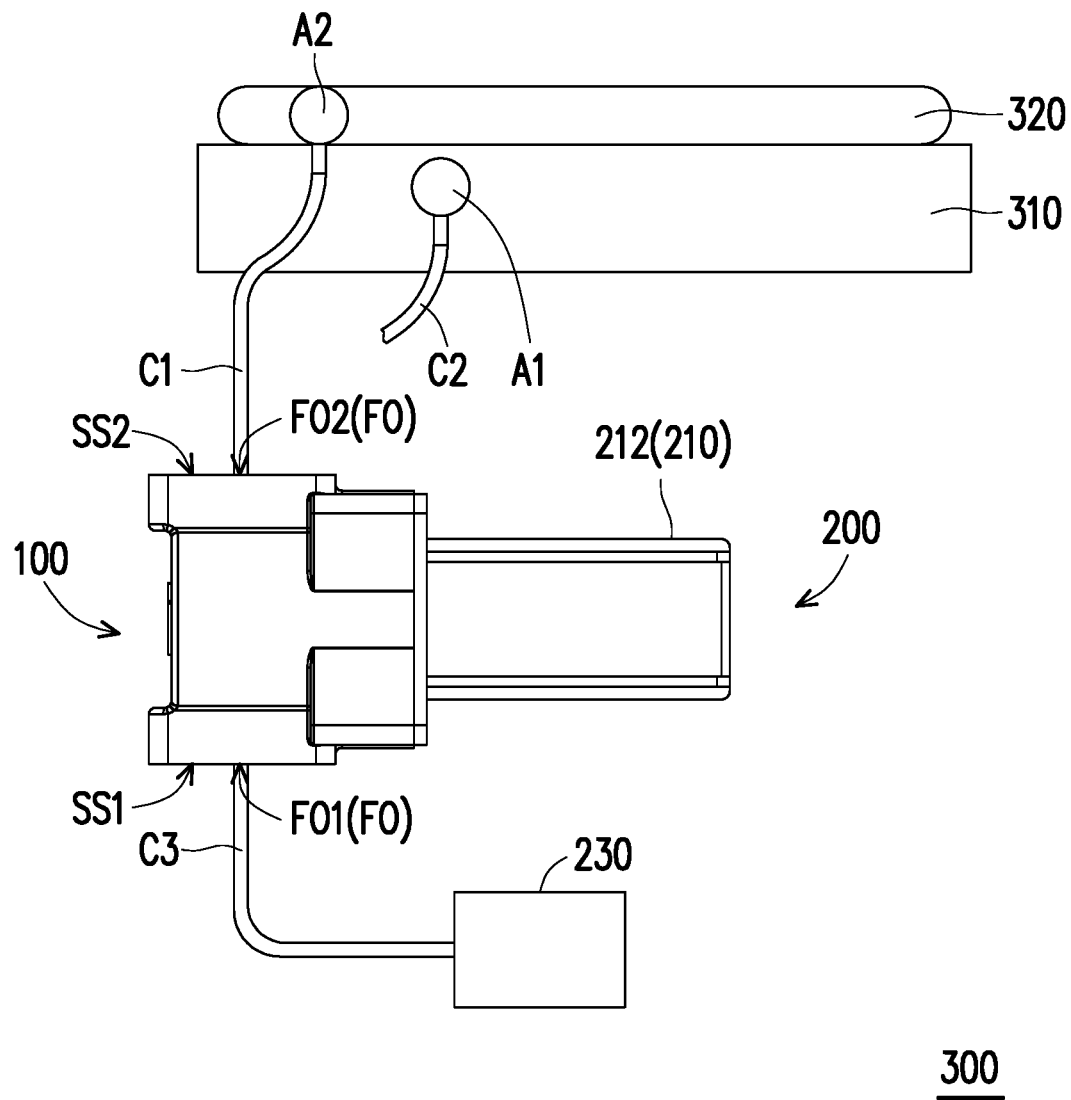
FIG. 1 is a schematic view showing a bed structure according to an embodiment of the disclosure.
Figure 2A:
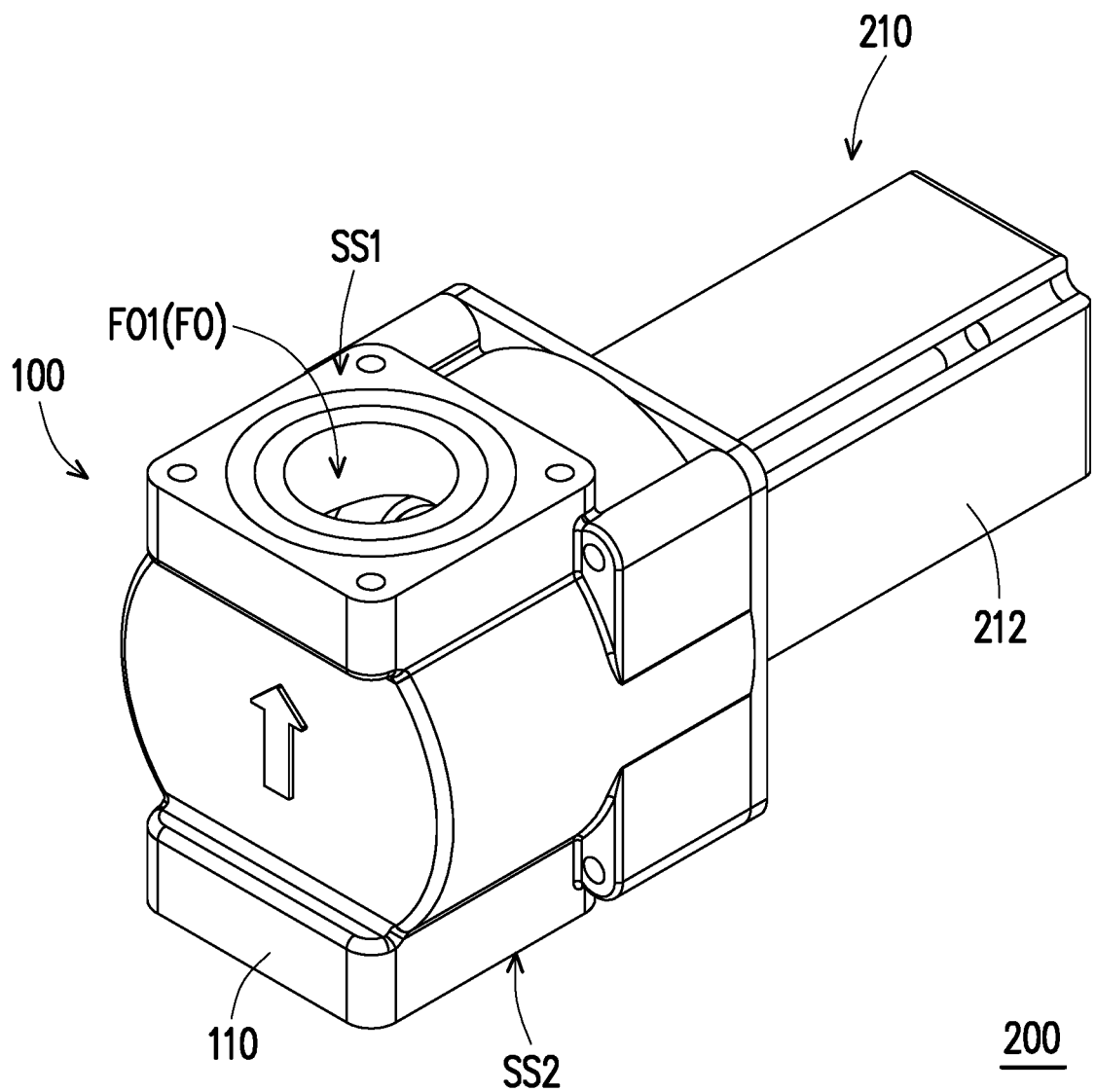
FIG. 2A to FIG. 2C are schematic views showing the appearance of an electromagnet switch valve in FIG. 1 from different viewing angles.
Figure 2B:
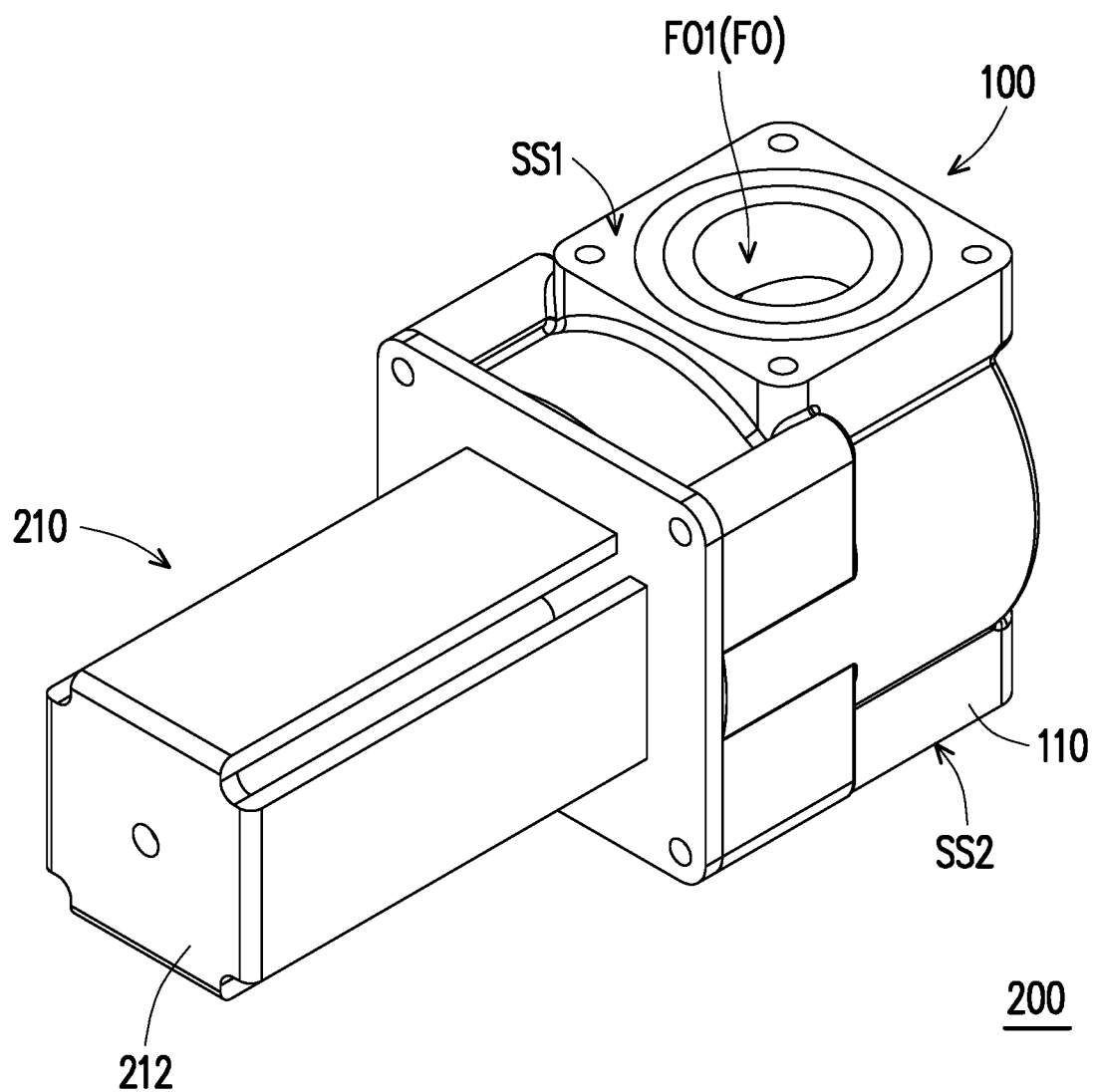
Figure 2C:
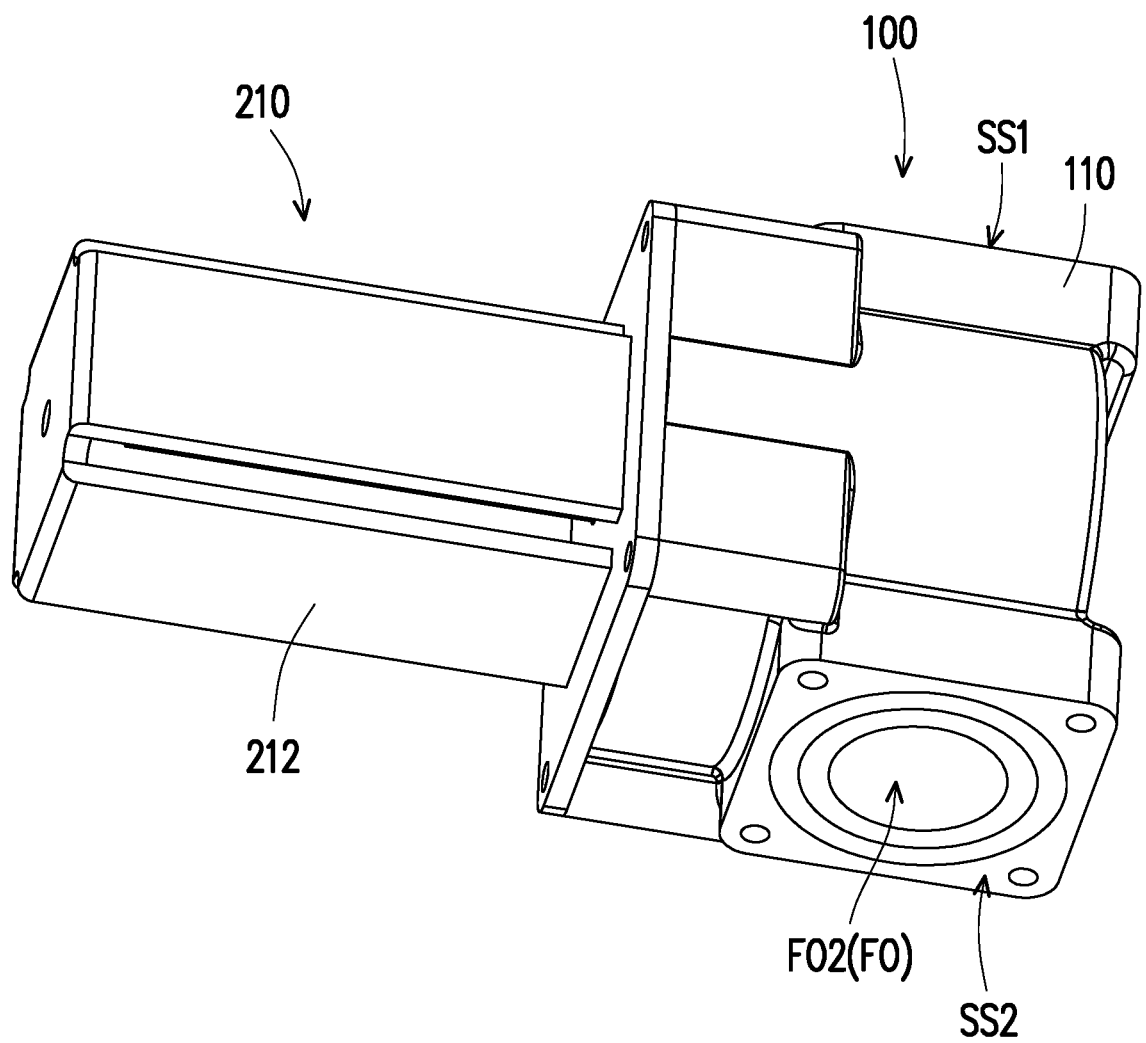

Referring to FIG. 1, FIG. 2A to FIG. 2C, FIG. 3A to FIG. 3C, and FIG. 4, in this embodiment, a bed structure 300 includes a base 310, at least one inflatable bladder 320, and an electromagnet switch valve 200. The electromagnet switch valve 200 includes an electromagnet driving member 210, a control rod 220, at least one valve body 100, and a fluid driving device 230. The number of the valve body 100 is only one, for example, but is not limited thereto. In other embodiments, the electromagnet switch valve 200 is not limited to inflating the bed structure 300 only, and may also inflate objects which need to be inflated, such as sofas or tents, and the disclosure is not limited thereto. The above elements will be described in detail in the following paragraphs.

The base 310 is an elastic (or deformable) element which may expand as a fluid is injected inside, or may contract as a fluid is drawn from inside.

The at least one inflatable bladder 320 is disposed on the base 310 and is also made of an elastic (or deformable) material. In this embodiment, the number of the inflatable bladder 320 is one, for example, but is not limited thereto.

Moreover, the base 310 and the inflatable bladder 320 respectively include control valves A1 and A2. The control valves A1 and A2 may be connected to the electromagnet switch valve 200 respectively via delivery pipelines C1 and C2 to perform inflation. In this embodiment, inflation of the inflatable bladder 320 is described as an example. However, in other embodiments, inflation may also be performed on the base 310, and the disclosure is not limited thereto.

Next, the elements inside the electromagnet switch valve 200 will be described.

Figure 3A:
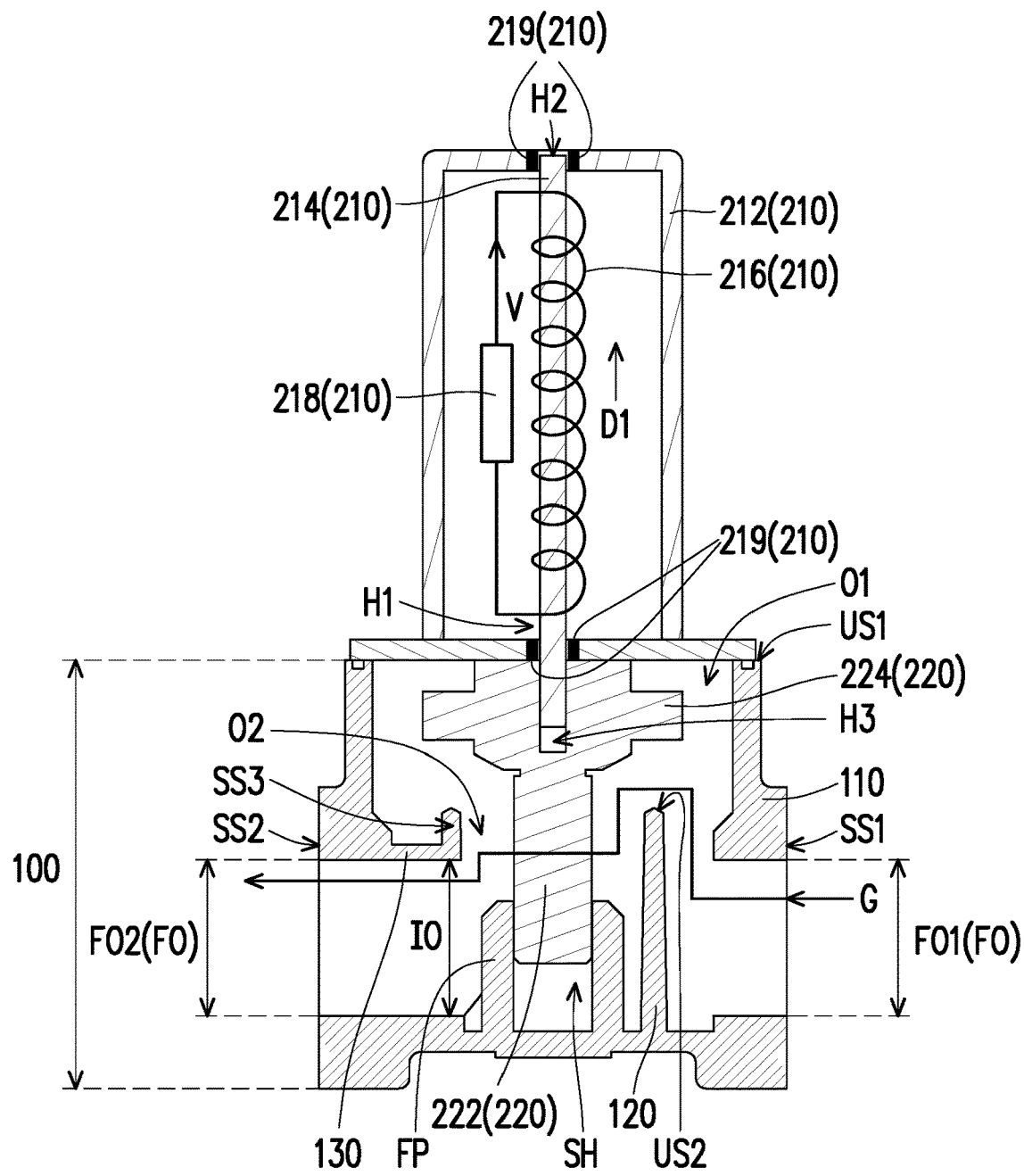
FIG. 3A is a schematic cross-sectional view showing the electromagnet switch valve in FIG. 1 in a first state.
Figure 3B:
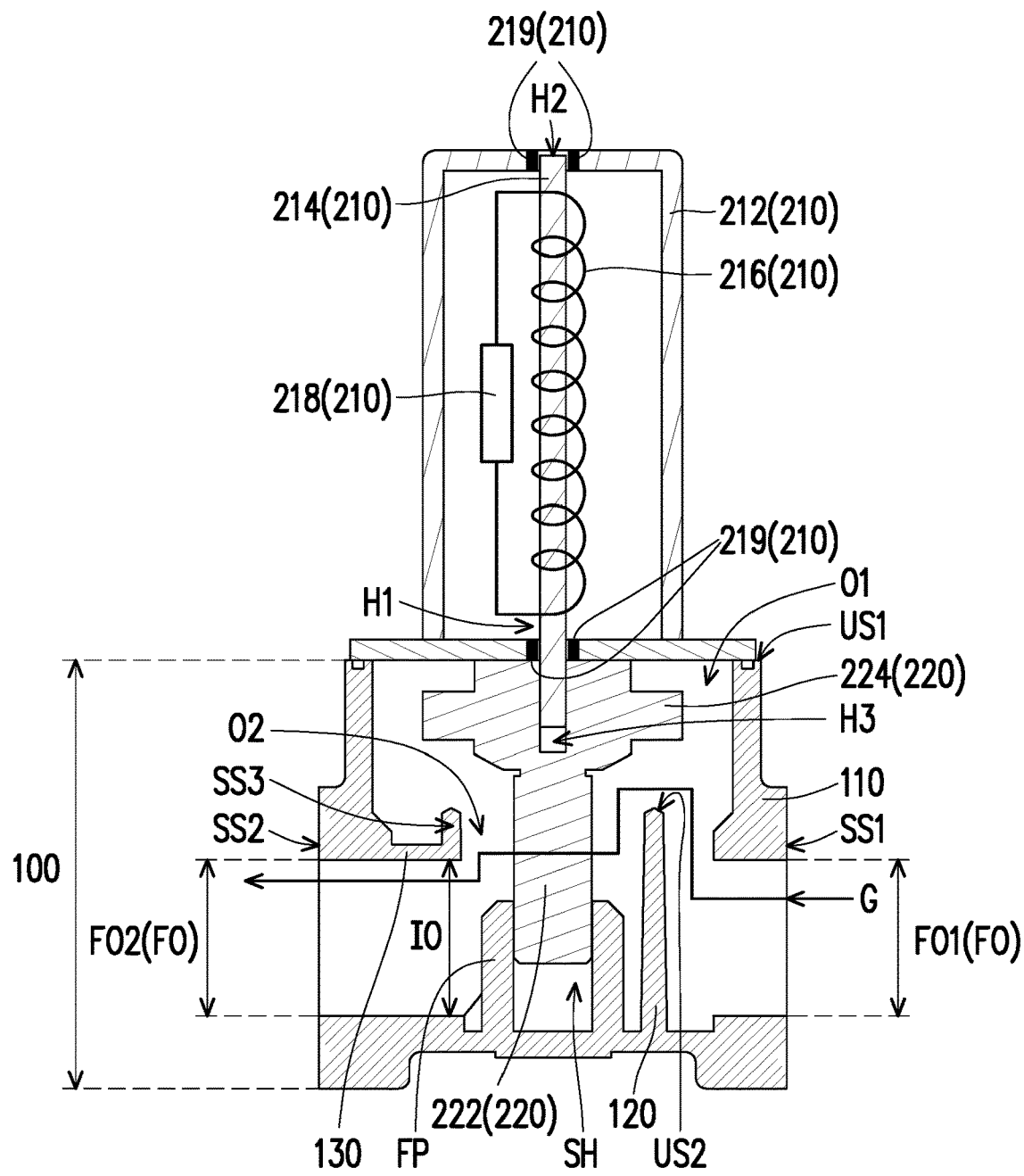
FIG. 3B is a schematic cross-sectional view showing the electromagnet switch valve in FIG. 1 in a second state.
Figure 3C:
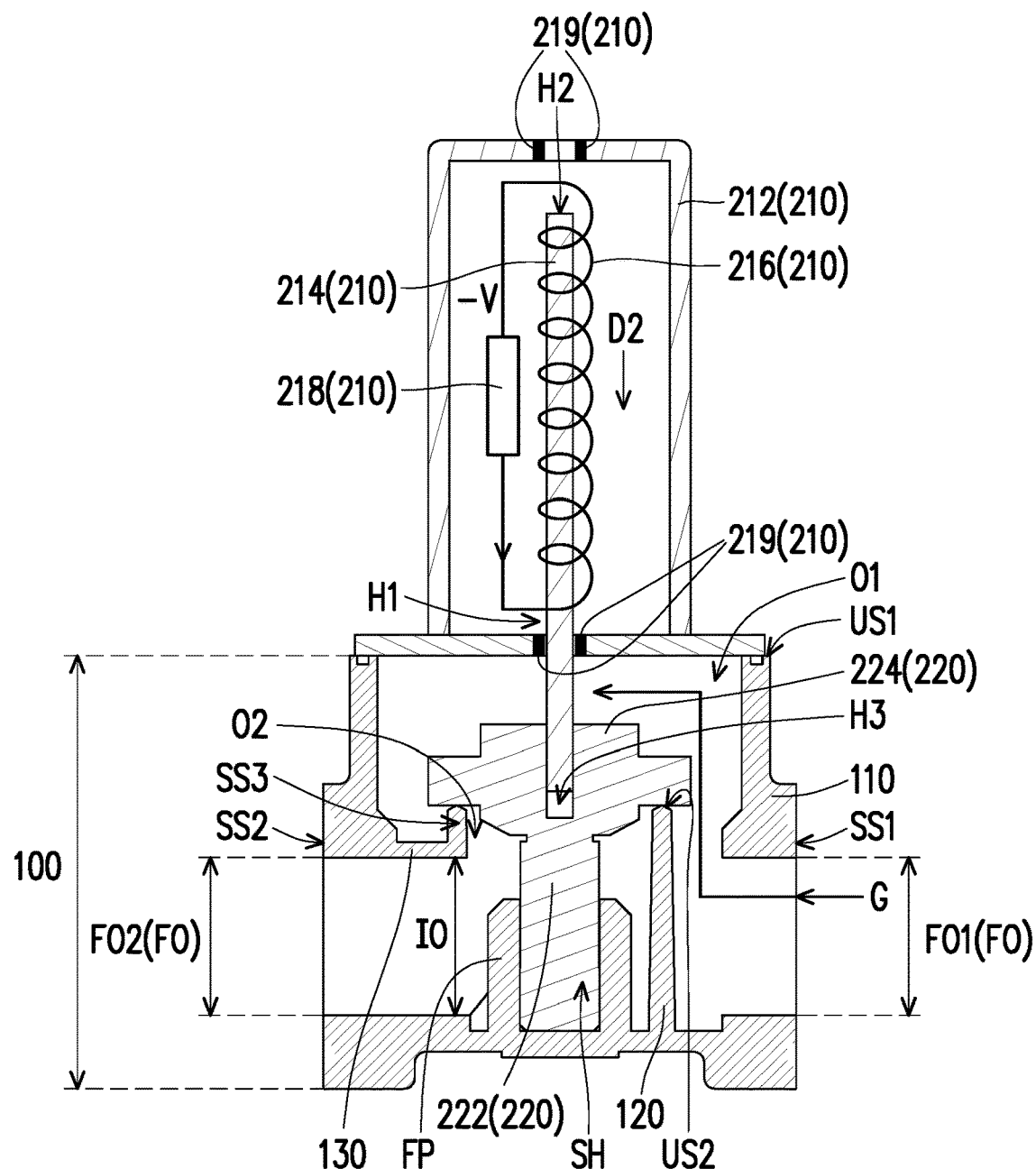
FIG. 3C is a schematic cross-sectional view showing the electromagnet switch valve in FIG. 1 in a third state.
Figure 4:
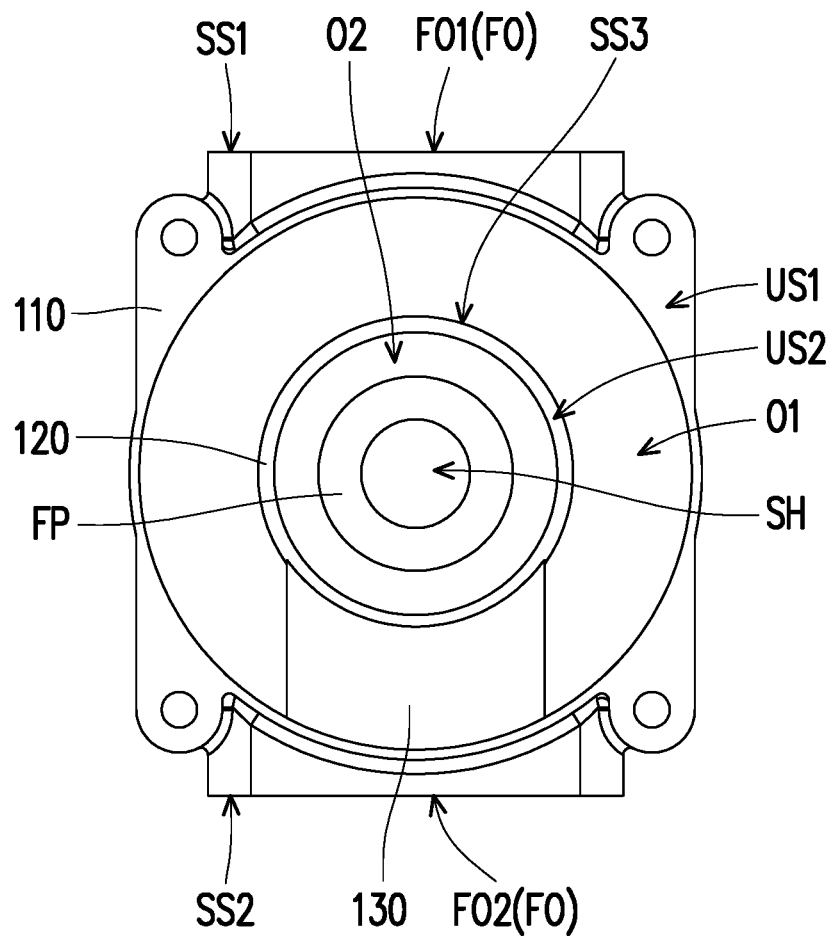
FIG. 4 is a top view showing a valve body in FIG. 1.

Referring to FIG. 3A to FIG. 3C, the electromagnet driving member 210 includes a housing 212, a rod body 214 (also referred to as a second rod body), at least one induction coil 216, a voltage supply 218, and a magnetic member 219. The number of the at least one induction coil 216 is plural, for example, but is not limited thereto. The rod body 214, the at least one induction coil 216, the voltage supply 218, and the magnetic member 219 are all disposed inside the housing 212, and the housing 212 provides protection effect. The housing 212 has two fitting holes H1 and H2 opposite to each other. The rod body 214 passes through at least one of the two fitting holes H1 and H2. The magnetic member 219 is, for example, a permanent magnet but is not limited thereto, and the number of the magnetic member 219 is two, for example, but is not limited thereto. The two magnetic members 219 are disposed respectively at the fitting holes H1 and H2, for example. In other embodiments, the number of the magnetic member 219 is only one, for example, and the magnetic member 219 is disposed at one of the two fitting holes H1 and H2. The at least one induction coil 216 surrounds the rod body 214. The voltage supply 218 is coupled to the at least one induction coil 216 and is configured to supply a voltage to the induction coil 216 to generate an induced magnetic field.

The control rod 220 includes a rod body 222 (also referred to as a first rod body) and a switch member 224 connected to each other. The switch member 224 is disposed at one end of the rod body 222, and the switch member 224 has a fitting hole H3 for the rod body 214 of the electromagnet driving member 210 to be fit into, so that the control rod 220 and the electromagnet driving member 210 are mechanically coupled to each other.

Referring to FIG. 3A to FIG. 3C and FIG. 4, the valve body 100 includes an outer wall 110, an inner wall 120, and a connecting wall 130. The outer wall 110 has a first upper surface US1, a first side surface SS1, and a second side surface SS2. The first upper surface US1 is connected to the first side surface SS1 and the second side surface SS2. The first upper surface US1 has a first opening O1. In the embodiments of the disclosure, at least one of the first side surface SS1 and the second side surface SS2 has a fluid hole FO. In this embodiment, the first side surface SS1 and the second side surface SS2 each have a fluid hole FO respectively referred to as a first fluid hole FO1 and a second fluid hole FO2. The inner wall 120 is disposed within the outer wall 110 and shields the first fluid hole FO1 and the second fluid hole FO2. In other words, the projections of the first fluid hole FO1 and the second fluid hole FO2 in a horizontal direction HD overlap the inner wall 120. The inner wall 120 has a second upper surface US2 and a third side surface SS3 connected to each other. The second upper surface US2 has a second opening O2, and the third side surface SS3 has an inner opening IO. The size of the switch member 224 is larger than the size of the second opening O2. The connecting wall 130 is disposed within the outer wall 110. The connecting wall 130 connects the inner opening IO of the inner wall 120 and the second fluid hole FO2 of the outer wall 110. In addition, the valve body 100 further has a limiting part FP. The limiting part FP is disposed within the inner wall 120 and has a limiting hole SH. The aperture of the first opening O1 is larger than the aperture of the second opening O2, and the aperture of the second opening O2 is larger than the aperture of the limiting hole SH. The opening directions of the first opening O1, the second opening O2, and the limiting hole SH are a vertical direction VD, and the opening directions of the first fluid hole FO1 and the second fluid hole FO2 are the horizontal direction HD.

Referring to FIG. 1, the fluid driving device 230 is a device configured to move a fluid G. Namely, it generally refers to a mechanical device which performs work on the fluid G, and is, for example, a fluid pump. The fluid driving device 230 may be connected to the first fluid hole FO1 or the second fluid hole FO2 of the valve body 100 via a delivery pipeline C3. In this embodiment, the fluid driving device 230 is connected to the first fluid hole FO1, for example, but is not limited thereto. The fluid driving device 230 is adapted to drive the fluid G through the fluid hole FO to the flow channel inside the valve body 100 to inflate the inflatable bladder 320, for example. In this embodiment, the fluid G is air, for example, but is not limited thereto.

In the following paragraphs, the technical effects of the electromagnet switch valve 200 in the bed structure 300 will be described in detail with reference to FIG. 3A to FIG. 3C.

Referring to FIG. 3A, FIG. 3A shows a first state of the electromagnet driving member 200. In the first state, the voltage supply 218 in the electromagnet driving member 200 supplies a first voltage V to the induction coil 216. At this time, the induction coil 216 generates an induced magnetic field, so that the rod body 214 generates a repulsive force relative to the magnetic member 219 to drive the rod body 214 to move in a direction D1 away from the valve body 100 and drive the switch member 224 to a first position. When the switch member 224 is at the first position, the second opening O2 is opened. At this time, the fluid driving device 230 drives the fluid G (the flow direction is indicated by a thick black line) to pour the fluid G into the valve body 100 via the first fluid hole FO1. Since the inner wall 120 shields the fluid hole FO, the fluid G is first blocked by the inner wall 120 and moves upward, and then enters the inner wall 120 via the second opening O2. Next, the fluid G enters the connecting wall 130 via the inner opening IO, and then flows out of the valve body 100 via the connecting wall 130 and the second fluid hole FO2 to inflate the inflatable bladder 320 via the delivery pipeline C1 shown in FIG. 1, thereby achieving the function of delivering the fluid G.

In the above process in which the fluid G enters the valve body 100, since the fluid G is first blocked by the inner wall 120, it flows upward through the second opening O2, the inner opening IO, and then to the second fluid hole FO2, rather than directly flows to the second fluid hole FO2. This design can effectively reduce the flow pressure of the fluid G and can realize the delivery of the fluid G in a large amount. Therefore, the electromagnet switch valve 200 of this embodiment can quickly inflate the inflatable bladder 320 of the bed structure 300, and the valve body 100 of the electromagnet switch valve 200 exhibits excellent reliability due to the low flow pressure.

Referring to FIG. 3B, FIG. 3B shows a second state of the electromagnet driving member 200. In the second state, the voltage supply 218 in the electromagnet driving member 200 is powered off (or stops supplying a voltage to the induction coil 216), so that the rod body 214 is attracted by the magnetic member 219 and maintains the position of the switch member 224. At this time, the position of the switch member 224 is, for example, the first position. Based on the above operation, in the power-off state, the electromagnet switch valve 200 may maintain the switch member 224 at the position of the previous state through the magnetic force of the magnetic member 219. The electromagnet switch valve 200 may also be referred to as a latching solenoid valve. Therefore, the electromagnet switch valve 200 of this embodiment can save power and avoid the risk of fire resulting from high heat generated during long-term operation.

Referring to FIG. 3C, FIG. 3C shows a third state of the electromagnet driving member 200. If the inflatable bladder 320 is already filled with the fluid G, it is not necessary to further inflate the inflatable bladder 320. Therefore, in the third state, the voltage supply 218 in the electromagnet driving member 200 supplies a second voltage −V, which is electrically opposite to the first voltage V, to the induction coil 216. At this time, the induction coil 216 generates an induced magnetic field in a reverse direction, so that the rod body 214 generates a repulsive force relative to the magnetic member 219 to drive the rod body 214 to move in a direction D2 toward the valve body 100 and drive the switch member 224 to a second position. When the switch member 224 is at the second position, the second opening O2 is closed. At this time, the fluid G can no longer flow out of the valve body 100 via the second fluid hole FO2, which thereby achieves the function of stopping the delivery of the fluid G to the inflatable bladder 320.

In other words, in FIG. 3A and FIG. 3C above, the electromagnet switch valve 200 can switch the position (the first position and the second position) of the switch member 224 through the electromagnet driving member 210 to selectively inflate the inflatable bladder 320.

According to the above, in the bed structure 300, the electromagnet switch valve 200, and the valve body 100 of this embodiment, by adopting the design of the inner wall 130 shielding the fluid hole FO, the flow pressure of the fluid G in the valve body 100 can be effectively reduced, and the valve body 100 exhibits excellent reliability due to the low flow pressure. Moreover, it is also possible to achieve delivery of the fluid G in a large amount to quickly inflate the inflatable bladder 320.

In addition, referring to FIG. 3A to FIG. 3C, in this embodiment, since the inner wall 120 is further provided with the limiting part FP, when the switch member 224 is switched between the positions shown in FIG. 3A to FIG. 3C, the rod body 214 of the electromagnet driving member 210 can be limited by the limiting part FP and does not easily deviate to other positions.

It is noted herein that part of the description in the above embodiment applies to the following embodiment, in which the description of the same technical content is omitted. Reference may be made to part of the description of the above embodiment for descriptions of the same elements, which will not be repeatedly described in the following embodiment.

Figure 5:
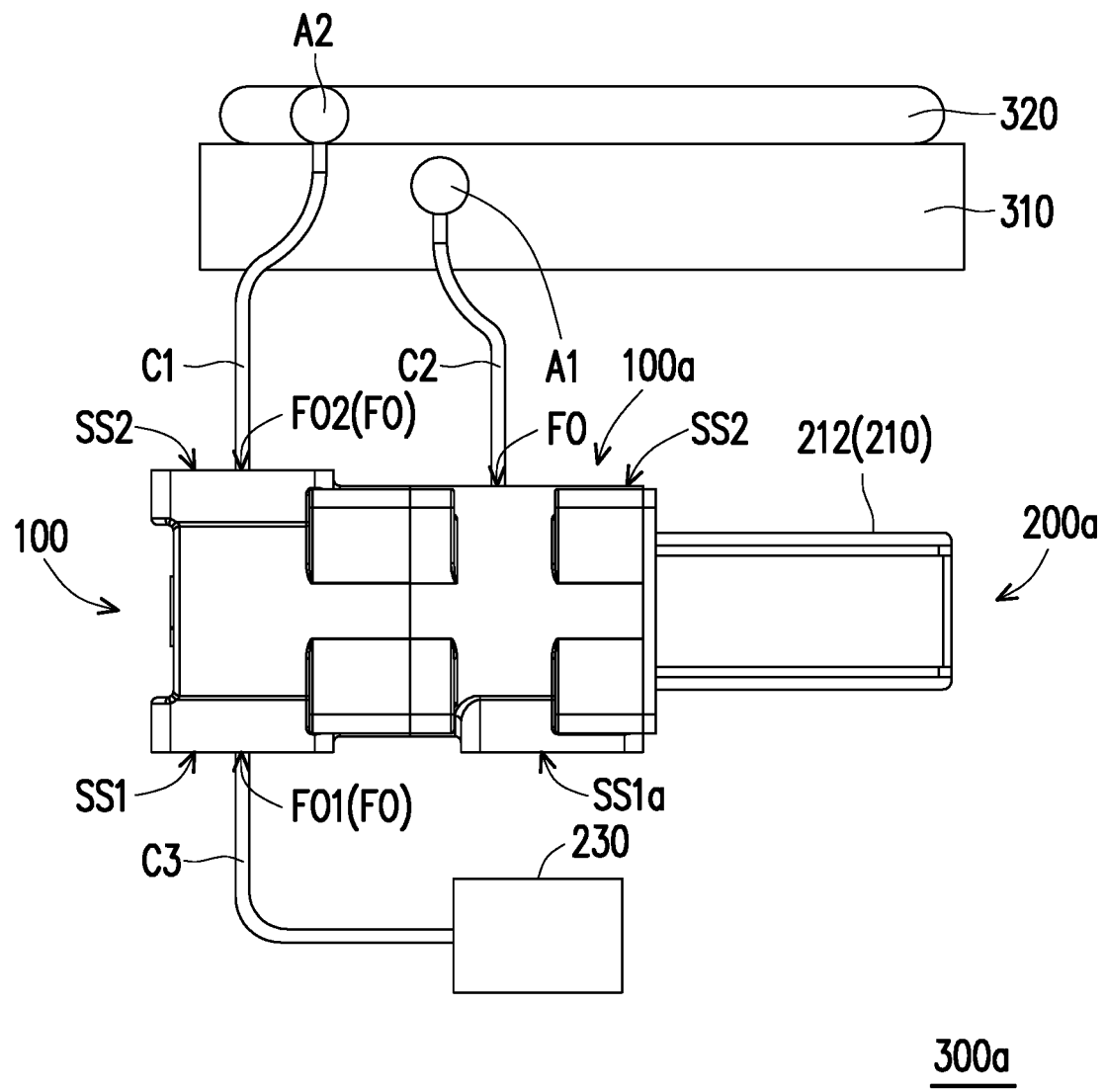
FIG. 5 is a schematic view showing a bed structure according to another embodiment of the disclosure.
Figure 6A:
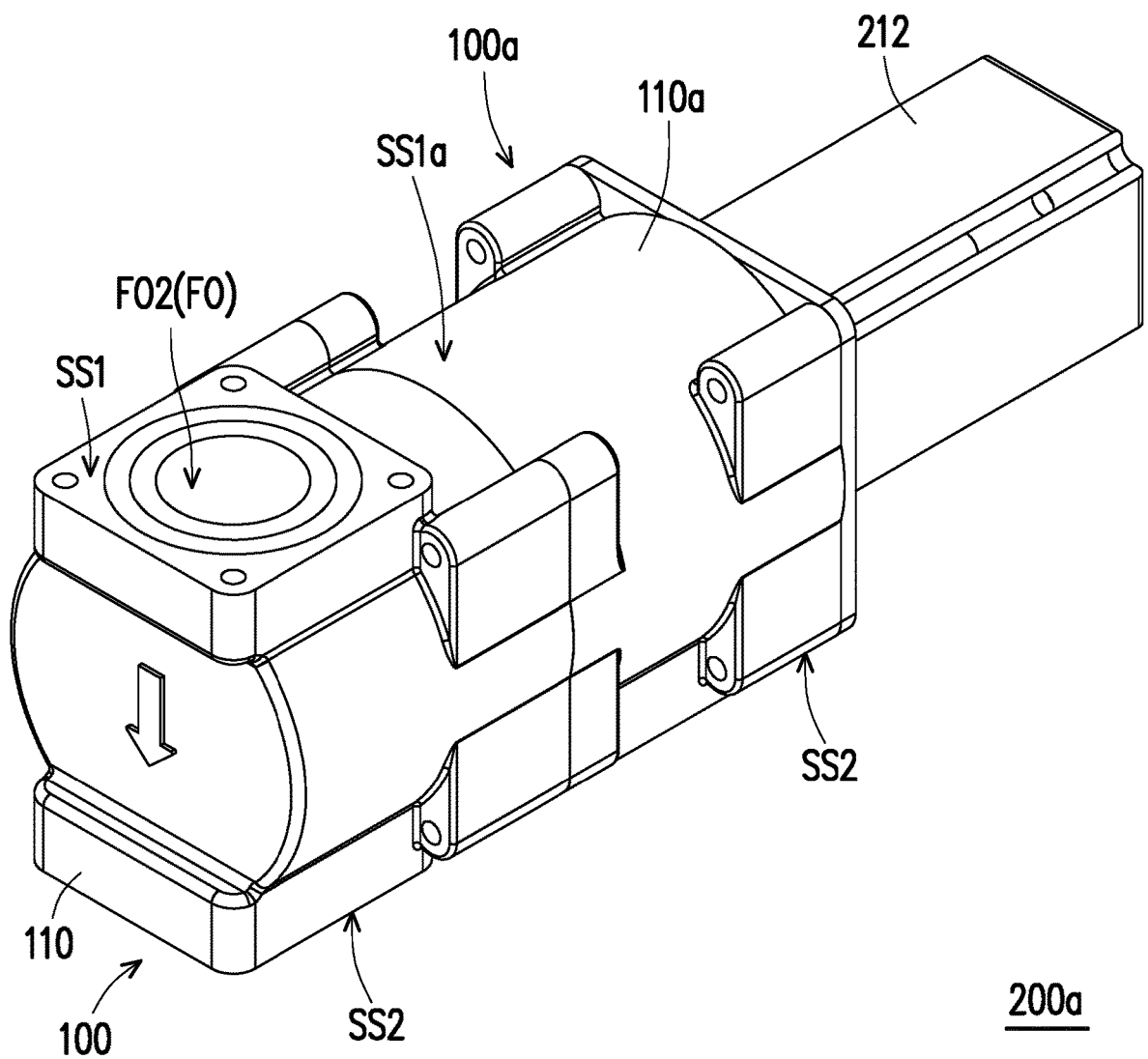
FIG. 6A to FIG. 6C are schematic views showing the appearance of an electromagnet switch valve in FIG. 5 from different viewing angles.
Figure 6B:
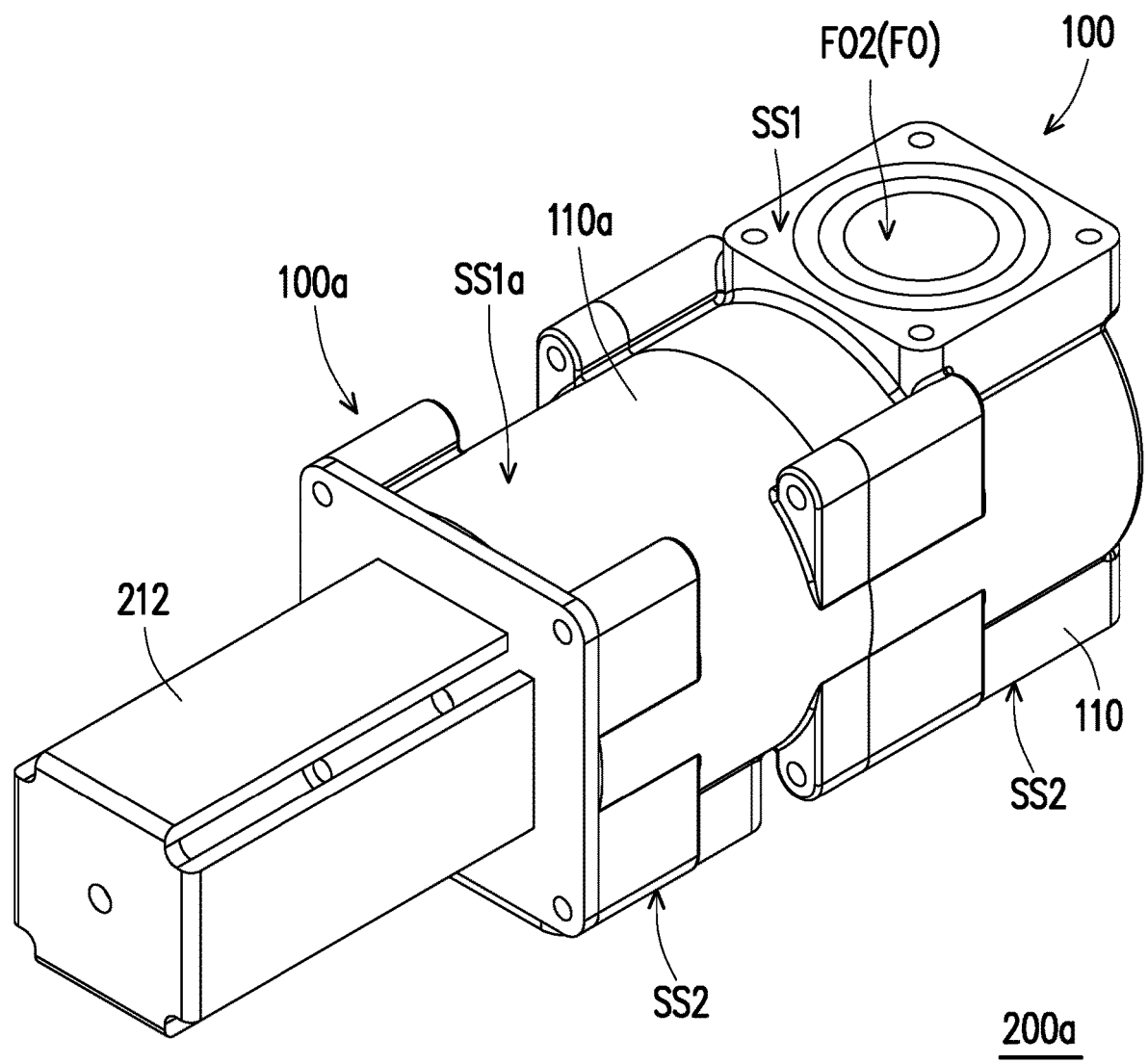
Figure 6C:
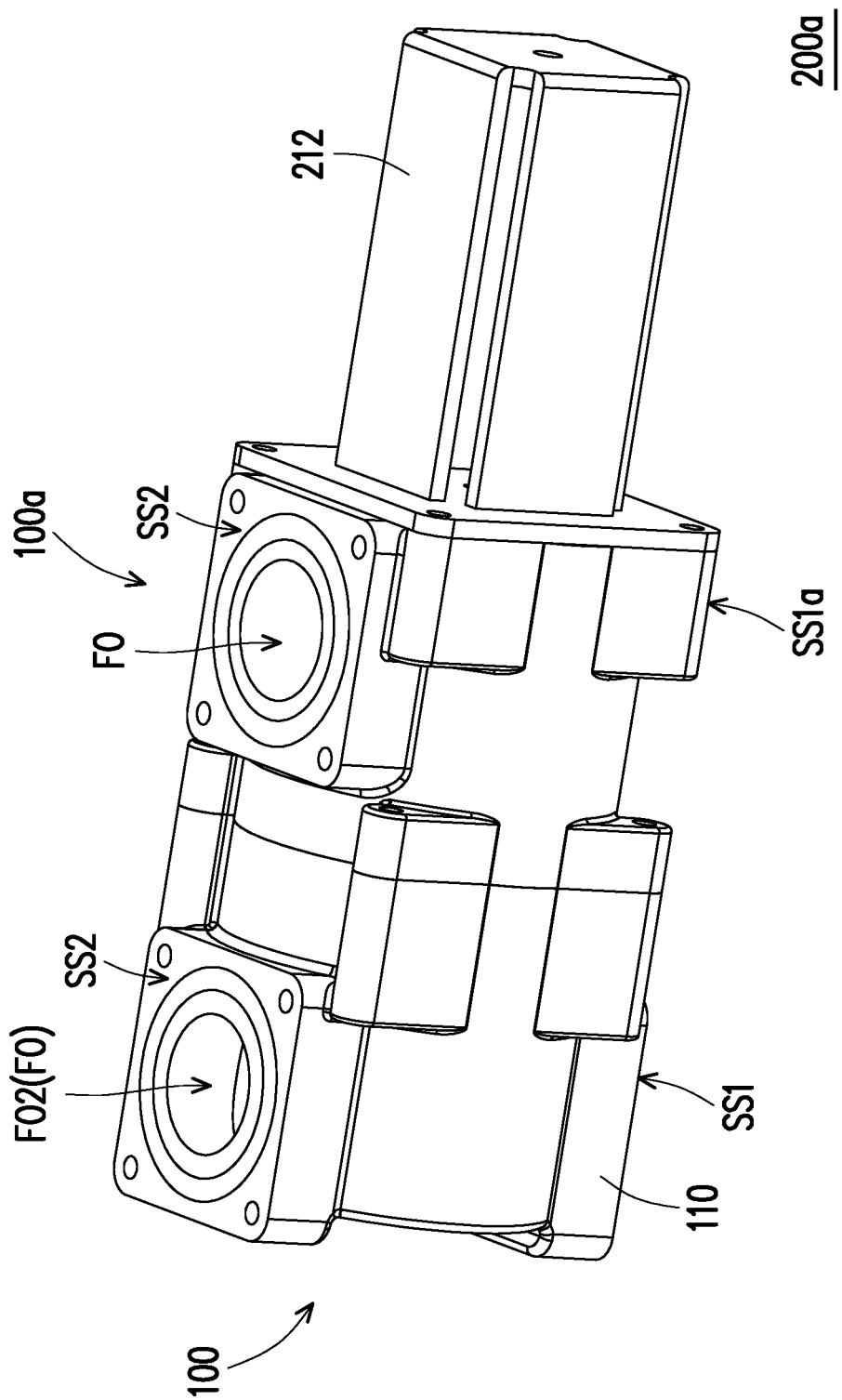
Figure 7A:
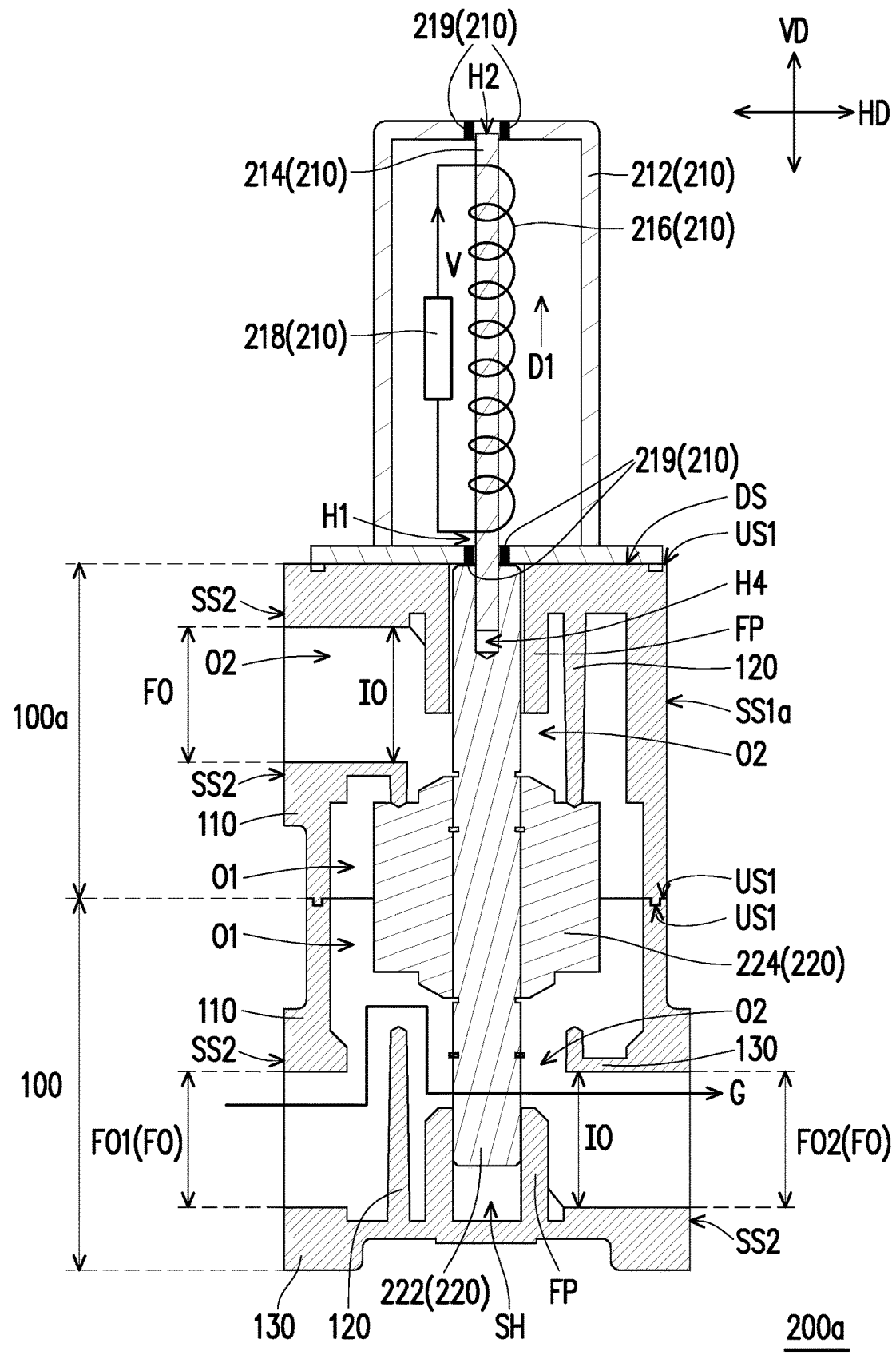
FIG. 7A is a schematic cross-sectional view showing the electromagnet switch valve in FIG. 5 in a first state.
Figure 7B:
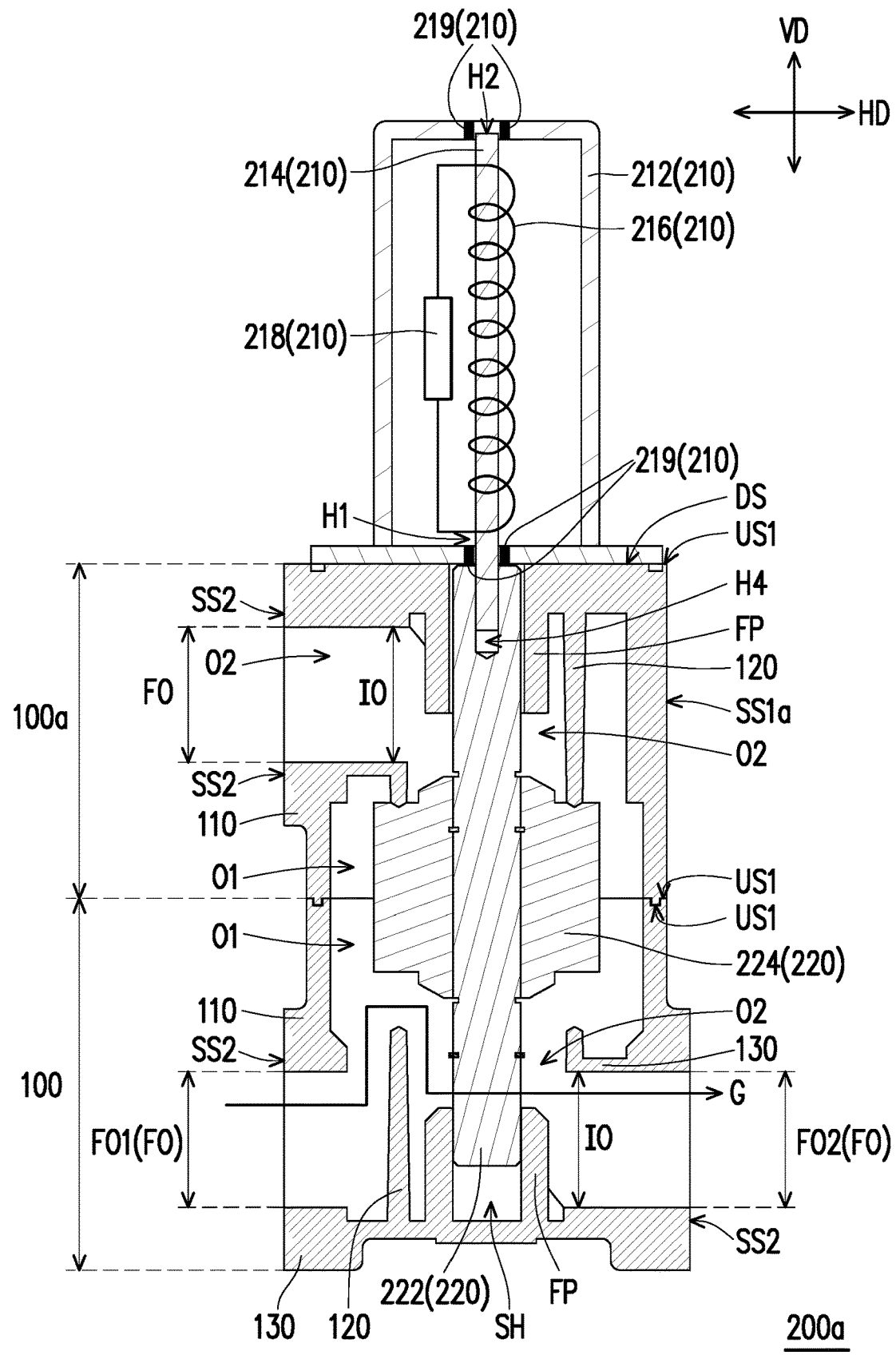
FIG. 7B is a schematic cross-sectional view showing the electromagnet switch valve in FIG. 5 in a second state.
Figure 7C:
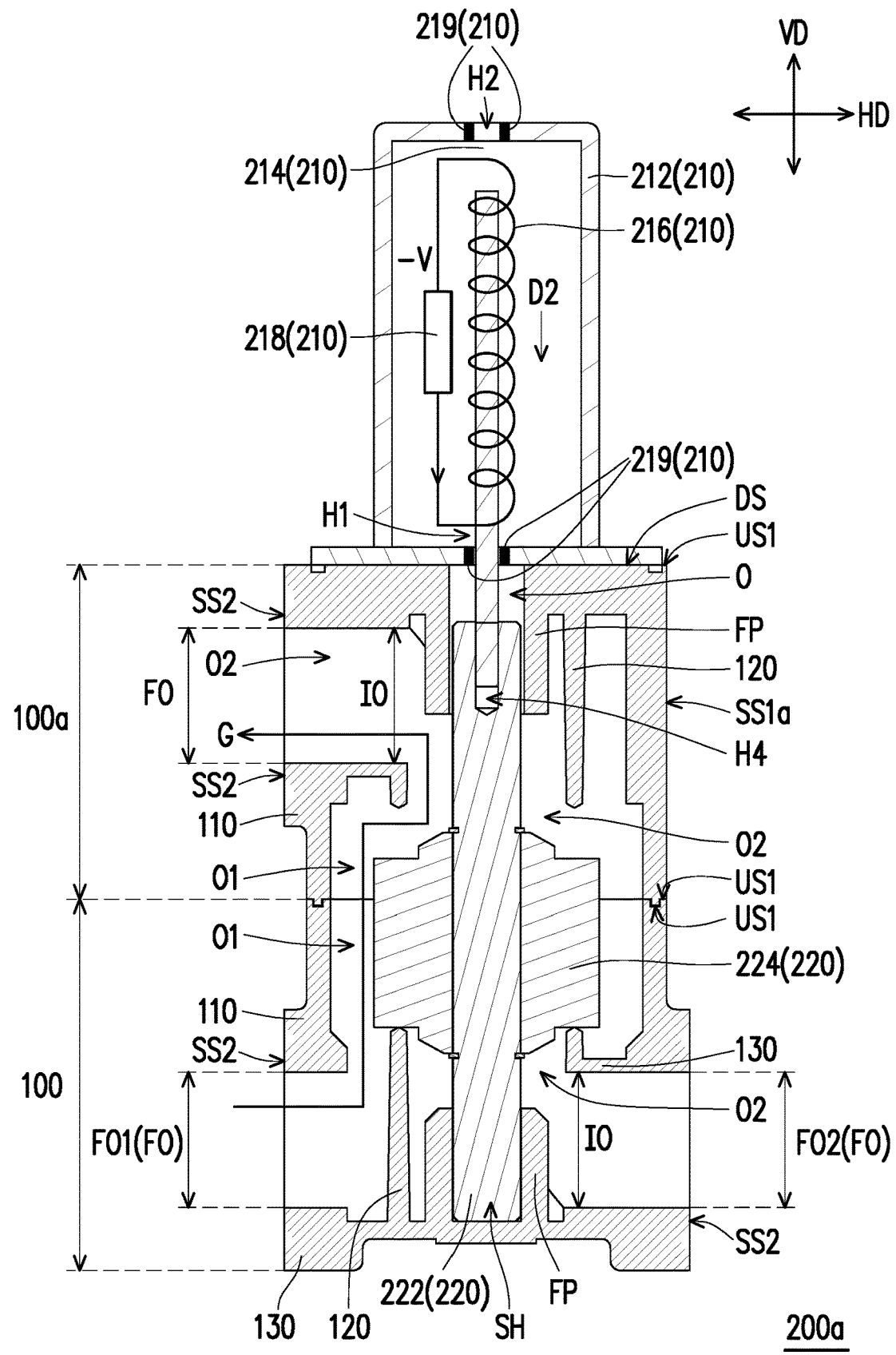
FIG. 7C is a schematic cross-sectional view showing the electromagnet switch valve in FIG. 5 in a third state.
Figure 8:
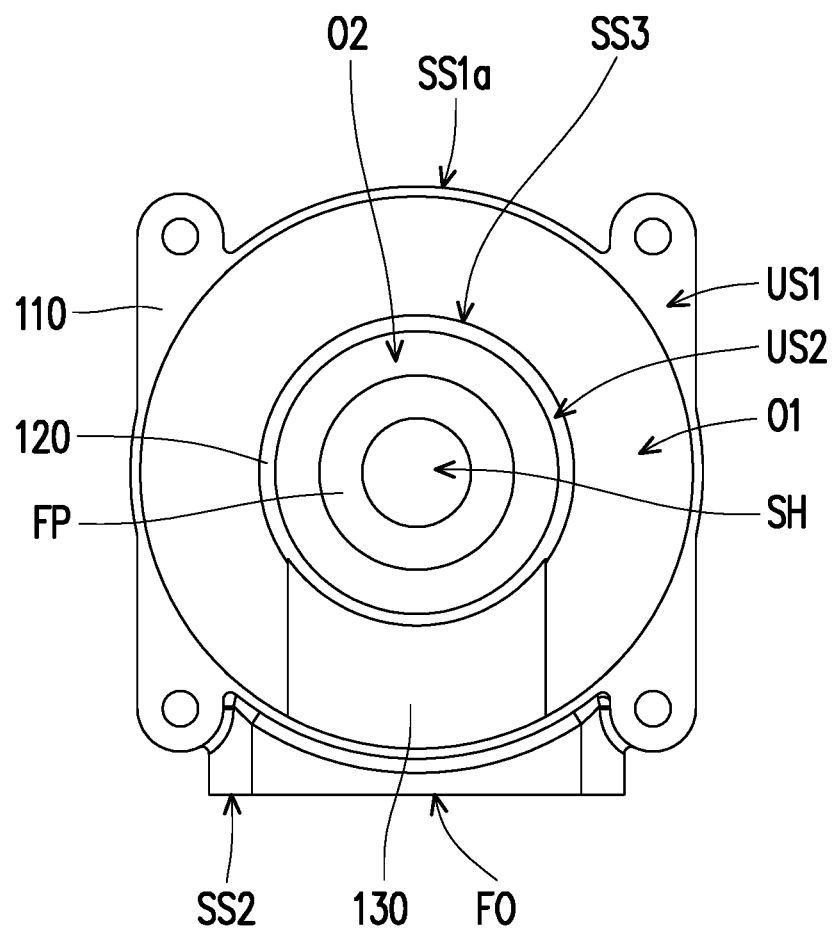
FIG. 8 is a top view showing a second valve body in FIG. 5.

FIG. 5 is a schematic view showing a bed structure according to another embodiment of the disclosure. FIG. 6A to FIG. 6C are schematic views showing the appearance of an electromagnet switch valve in FIG. 5 from different viewing angles. FIG. 7A is a schematic cross-sectional view showing the electromagnet switch valve in FIG. 5 in a first state. FIG. 7B is a schematic cross-sectional view showing the electromagnet switch valve in FIG. 5 in a second state. FIG. 7C is a schematic cross-sectional view showing the electromagnet switch valve in FIG. 5 in a third state. FIG. 8 is a top view showing a second valve body in FIG. 5.

Referring to FIG. 5, a bed structure 300a of FIG. 5 is substantially similar to the bed structure 300 of FIG. 1, and the main difference lies in that the structure and the adopted number of a valve body 100a are different from those in the bed structure 300 of FIG. 1. In the bed structure 300a, the number of the valve body 100 of an electromagnet switch valve 200a is plural, for example, and is two as an example, e.g., a first valve body 100 and a second valve body 100a. The structure and function of the first valve body 100 are as described in FIG. 3A to FIG. 3C and FIG. 4 above and will not be repeatedly described herein. In the following paragraphs, the differences between the structures of the second valve body 100a and the first valve body 100 will be described.

Referring to FIG. 5, FIG. 6A to FIG. 6C, FIG. 7A to FIG. 7C, and FIG. 8, in the second valve body 100a, the main difference from the first valve body 100 lies in that one of the first side surface SS1a and the second side surface SS2 of the second valve body 100a has a fluid hole FO, while the other does not. In this embodiment, the second side surface SS2 of the second valve body 100a has a fluid hole FO, but the first side surface SS1a does not. However, the disclosure is not limited thereto. As shown in FIG. 5, the first fluid hole FO1 of the first valve body 100 is connected to the fluid driving device 230 via the delivery pipeline C3, and the second fluid hole FO2 of the first valve body 100 is connected to the control valve A2 of the inflatable bladder 320 via the delivery pipeline C1. The fluid hole FO of the second valve body 100a is connected to the control valve A1 of the base 310 via the delivery pipeline C2. Referring to FIG. 7A to FIG. 7C, the first opening O1 of the first valve body 100 is joined with the first opening O1 of the second valve body 100a. Moreover, the control rod 220 is disposed within the outer wall 110 of the first valve body 100 and within the outer wall 110 of the second valve body 100a. The rod body 222 of the control rod 220 is fit in the two limiting parts FP of the first valve body 100 and the second valve body 100a. In addition, a lower surface DS of the second valve body 100a has an opening O, and the position of the opening O corresponds to the position of the limiting part FP. The rod body 222 has a fitting hole H4. The rod body 214 of the electromagnet driving member 210 is mechanically coupled to the rod body 222 located in the first valve body 100 and the second valve body 100a via the opening O.

In the following paragraphs, the technical effects of the electromagnet switch valve 200a in the bed structure 300a will be described in detail with reference to FIG. 7A to FIG. 7C.

Referring to FIG. 7A, FIG. 7A shows a first state of the electromagnet driving member 200a. In the first state, the voltage supply 218 in the electromagnet driving member 200a supplies a first voltage V to the induction coil 216. At this time, the induction coil 216 generates an induced magnetic field, so that the rod body 214 generates a repulsive force relative to the magnetic member 219 to drive the rod body 214 to move in the direction D1 away from the first valve body 100 (or in a direction close to the second valve body 100a) and drive the switch member 224 to a first position. When the switch member 224 is at the first position, the switch member 224 can open the second opening O2 of the first valve body 100 and close the second opening O2 of the second valve body 100a. At this time, the fluid driving device 230 drives the fluid G (the flow direction is indicated by a thick black line) to pour the fluid G into the first valve body 100 via the first fluid hole FO1. The fluid G is first blocked by the inner wall 120 and moves upward, and then enters the inner wall 120 via the second opening O2. Next, the fluid G enters the connecting wall 130 via the inner opening IO, and then flows out of the first valve body 100 via the connecting wall 130 and the second fluid hole FO2 to inflate the inflatable bladder 320 via the delivery pipeline C1 in FIG. 5, thereby achieving the function of delivering the fluid G.

Referring to FIG. 7B, FIG. 7B shows a second state of the electromagnet driving member 200a. In the second state, the voltage supply 218 in the electromagnet driving member 200a is powered off (or stops supplying a voltage to the induction coil 216), so that the rod body 214 is attracted by the magnetic member 219 to maintain the position of the switch member 224. At this time, the position of the switch member 224 is, for example, the first position.

Referring to FIG. 7C, FIG. 7C shows a third state of the electromagnet driving member 200a. If the inflatable bladder 320 is already filled with the fluid G, it is not necessary to further inflate the inflatable bladder 320. Therefore, in the third state, the voltage supply 218 in the electromagnet driving member 200a supplies a second voltage −V, which is electrically opposite to the first voltage V, to the induction coil 216. At this time, the induction coil 216 generates an induced magnetic field in a reverse direction, so that the rod body 214 generates a repulsive force relative to the magnetic member 219 to drive the rod body 214 to move in the direction D2 toward the valve body 100 and drive the switch member 224 to a second position. When the switch member 224 is at the second position, the switch member 224 can close the second opening O2 of the first valve body 100 and open the second opening O2 of the second valve body 100a. At this time, the fluid driving device 230 drives the fluid G (the flow direction is indicated by a thick black line) to pour the fluid G into the first valve body 100 via the first fluid hole FO1. Since the inner wall 120 shields the fluid hole FO, the fluid G is first blocked by the inner wall 120 and moves upward, and then sequentially passes through the first opening O1 of the first valve body 100 and the first opening O1 of the second valve body 100a. Next, the fluid G enters the connecting wall 130 of the second valve body 100a via the inner opening IO of the second valve body 100a, and then flows out of the second valve body 100a via the connecting wall 130 and the fluid hole FO to inflate the base 310 via the delivery pipeline C2 in FIG. 5, thereby achieving the function of delivering the fluid G.

According to the above, in the electromagnet switch valve 200a of this embodiment, through the arrangement relationship between the first valve body 100 and the second valve body 100a and the switching of the position of the switch member 224, it is possible to selectively inflate the base 310 or the inflatable bladder 320.

In summary of the above, in the valve body, the electromagnet switch valve, and the bed structure of the embodiments of the disclosure, one or more of the following advantages may be exhibited:

1. Through the design of the inner wall shielding the fluid hole, the flow pressure of the fluid in the valve body can be effectively reduced, and the valve body exhibits excellent reliability due to the low flow pressure. Moreover, it is possible to achieve the delivery of fluid in a large amount.

2. The voltage supply in the electromagnet switch valve inputs induction voltages of different phases to the induction coil to switch the position of the control rod to different positions, i.e., the first position and the second position. In addition, it is possible that the voltage supply does not supply power to the induction coil. In the power-off state, the magnetic member may attract the rod body and maintain the position of the switch member. Therefore, the electromagnet switch valve can save power and avoid the risk of fire.

3. Since the bed structure adopts the above design of the valve body and the electromagnet switch valve, it can inflate its inflatable bladder or base quickly.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electromagnet switch valve comprising:
  an electromagnet driving member;
  a control rod comprising a first rod body and a switch member connected to each other, wherein the control rod is mechanically coupled to the electromagnet driving member through the first rod body;
  at least one valve body comprising:
    an outer wall having a first upper surface, a first side surface, and a second side surface, wherein the first upper surface is connected to the first side surface and the second side surface, the first upper surface has a first opening, and at least one of the first side surface and the second side surface has a fluid hole;
    an inner wall disposed within the outer wall, wherein the inner wall is in a location that is in line with the at least one fluid hole, the inner wall has a second upper surface and a third side surface connected to the second upper surface, the second upper surface has a second opening, and a size of the switch member is larger than a size of the second opening, wherein opening directions of the first opening and the second opening are the same, and the third side surface has an inner opening; and
    a connecting wall disposed within the outer wall, wherein the connecting wall connects the inner opening of the inner wall and the fluid hole of the outer wall; and
  a fluid driving device connected to the fluid hole of the outer wall and adapted to drive a fluid to a flow channel in the valve body via the fluid hole, wherein
  in a first state, the electromagnet driving member drives the first rod body to drive the switch member to move to a first position,
  in a second state, the electromagnet driving member is powered off to maintain a position of the switch member, and
  in a third state, the electromagnet driving member drives the first rod body to drive the switch member to move to a second position, wherein the first position is different from the second position.

2. The electromagnet switch valve according to claim 1, wherein the first side surface and the second side surface both have a fluid hole.

3. The electromagnet switch valve according to claim 1, wherein the fluid hole provided in the first side surface is a first fluid hole, and the fluid hole provided in the second side surface is a second fluid hole, wherein the inner wall is in a location that is in line with the first fluid hole and the second fluid hole and is located between the first fluid hole and the second fluid hole, and the connecting wall connects the second fluid hole of the outer wall.

4. The electromagnet switch valve according to claim 1, wherein the electromagnet driving member further comprises:
a housing comprising two fitting holes opposite to each other;
a second rod body passed through at least one of the two fitting holes, wherein the second rod body is connected to the first rod body of the control rod;
at least one induction coil disposed in the housing and surrounding the second rod body;
a voltage supply coupled to the at least one induction coil; and
a magnetic member disposed at at least one of the two fitting holes.

5. The electromagnet switch valve according to claim 4, wherein
in the first state, the voltage supply supplies a first voltage to the induction coil, so that the second rod body generates a repulsive force relative to the magnetic member to drive the first rod body to the first position,
in the second state, the voltage supply stops supplying a voltage to the induction coil, so that the second rod body is attracted by the magnetic member to maintain a position of the switch member, and
in the third state, the voltage supply supplies a second voltage, which is electrically opposite to the first voltage, to the induction coil, so that the second rod body generates a repulsive force relative to the magnetic member to drive the first rod body to the second position.

6. The electromagnet switch valve according to claim 1, wherein the at least one valve body comprises a plurality of valve bodies, and the valve bodies comprise a first valve body and a second valve body, wherein
the first side surface and the second side surface of the first valve body both have a fluid hole, and
one of the first side surface and the second side surface of the second valve body has a fluid hole, while the other does not have a fluid hole,
wherein the first opening of the first valve body is joined with the first opening of the second valve body, and the control rod is disposed within the outer wall of the first valve body and the outer wall of the second valve body.

7. A bed structure comprising:
an electromagnet switch valve comprising:
an electromagnet driving member;
a control rod comprising a first rod body and a switch member connected to each other, wherein the control rod is mechanically coupled to the electromagnet driving member through the first rod body;
at least one valve body comprising:
an outer wall having a first upper surface, a first side surface, and a second side surface, wherein the first upper surface is connected to the first side surface and the second side surface, the first upper surface has a first opening, and at least one of the first side surface and the second side surface has a fluid hole;
an inner wall disposed within the outer wall, wherein the inner wall is in a location that is in line with the at least one fluid hole, the inner wall has a second upper surface and a third side surface connected to the second upper surface, the second upper surface has a second opening, and a size of the switch member is larger than a size of the second opening,
wherein opening directions of the first opening and the second opening are the same, and the third side surface has an inner opening; and
a connecting wall disposed within the outer wall, wherein the connecting wall connects the inner opening of the inner wall and the at least one fluid hole of the outer wall; and
a fluid driving device connected to the fluid hole of the outer wall and adapted to drive a fluid to a flow channel in the valve body via the fluid hole, wherein
in a first state, the electromagnet driving member drives the first rod body to drive the switch member to move to a first position,
in a second state, the electromagnet driving member is powered off to maintain a position of the switch member, and
in a third state, the electromagnet driving member drives the first rod body to drive the switch member to move to a second position, wherein the first position is different from the second position; and
at least one inflatable bladder connected to the at least one fluid hole of the valve body, wherein the fluid driving device drives the fluid so that the fluid passes through the valve body to inflate the at least one inflatable bladder.

8. The bed structure according to claim 7, wherein the at least one valve body comprises a plurality of valve bodies, and the valve bodies comprise a first valve body and a second valve body, wherein
the first side surface and the second side surface of the first valve body both have a fluid hole, and
one of the first side surface and the second side surface of the second valve body has a fluid hole, while the other does not have a fluid hole,
wherein the first opening of the first valve body is joined with the first opening of the second valve body, and the control rod is disposed within the outer wall of the first valve body and the outer wall of the second valve body.

9. The bed structure according to claim 8, wherein the first valve body and the second valve body each comprise a limiting part disposed within the corresponding inner wall, and the limiting part comprises a limiting hole, wherein the first rod body of the control rod is fit in the two limiting parts.

10. The bed structure according to claim 7, wherein the electromagnet driving member further comprises:
a housing comprising two fitting holes opposite to each other;
a second rod body passed through at least one of the two fitting holes, wherein the second rod body is connected to the first rod body of the control rod;
at least one induction coil disposed in the housing and surrounding the second rod body;
a voltage supply coupled to the at least one induction coil; and a magnetic member disposed at at least one of the two fitting holes.

11. The bed structure according to claim 10, wherein
in the first state, the voltage supply in the electromagnet driving member supplies a first voltage to the induction coil, so that the second rod body generates a repulsive force relative to the magnetic member to drive the first rod body to the first position,
in the second state, the voltage supply in the electromagnet driving member stops supplying a voltage to the induction coil, so that the second rod body is attracted by the magnetic member to maintain a position of the switch member, and
in the third state, the voltage supply in the electromagnet driving member supplies a second voltage, which is electrically opposite to the first voltage, to the induction coil, so that the second rod body generates a repulsive force relative to the magnetic member to drive the first rod body to the second position.

* * * * *